United States Patent [19]

Freeburg et al.

[11] Patent Number: 5,008,938
[45] Date of Patent: Apr. 16, 1991

[54] ENCRYPTION APPARATUS

[75] Inventors: Thomas A. Freeburg, Arlington Heights; Richard E. White, Schaumburg, both of Ill.

[73] Assignee: Motorola, Inc., Schaumburg, Ill.

[21] Appl. No.: 490,900

[22] Filed: Mar. 9, 1990

[51] Int. Cl.$^5$ .............................................. H04L 9/00
[52] U.S. Cl. .......................................... 380/50; 380/43
[58] Field of Search ................................... 380/50, 43

[56] References Cited

U.S. PATENT DOCUMENTS

| | | | |
|---|---|---|---|
| 4,598,170 | 7/1986 | Piosenka et al. | 178/22.08 |
| 4,694,492 | 9/1987 | Wirstrom et al. | 380/23 |
| 4,751,733 | 6/1988 | Delayaye et al. | 380/50 |
| 4,860,353 | 8/1989 | Brown | 380/50 |
| 4,899,383 | 2/1990 | Einolf, Jr. et al. | 380/50 |

Primary Examiner—Thomas H. Tarcza
Assistant Examiner—David Cain
Attorney, Agent, or Firm—Kenneth W. Bolvin

[57] ABSTRACT

An encryption circuit that operates with substantially zero delay. Using programmable keys and polynomials, the encryption algorithm can be constantly changed to thwart any unintended receiving parties from decoding the data. A key (101) and a polynomial (102) are loaded into registers. The key is then loaded into a shift register and shifted through XOR gates (106) at a programmable rate. The other input of the XOR gates come from the result of ANDing (103) a disable signal, the polynomial register (102), and the last stage of the shift register (104). Eight bits of the shift register outputs are XOR'ed with the input data to be encrypted. The output of these XOR gates (105) is the encrypted data.

18 Claims, 3 Drawing Sheets

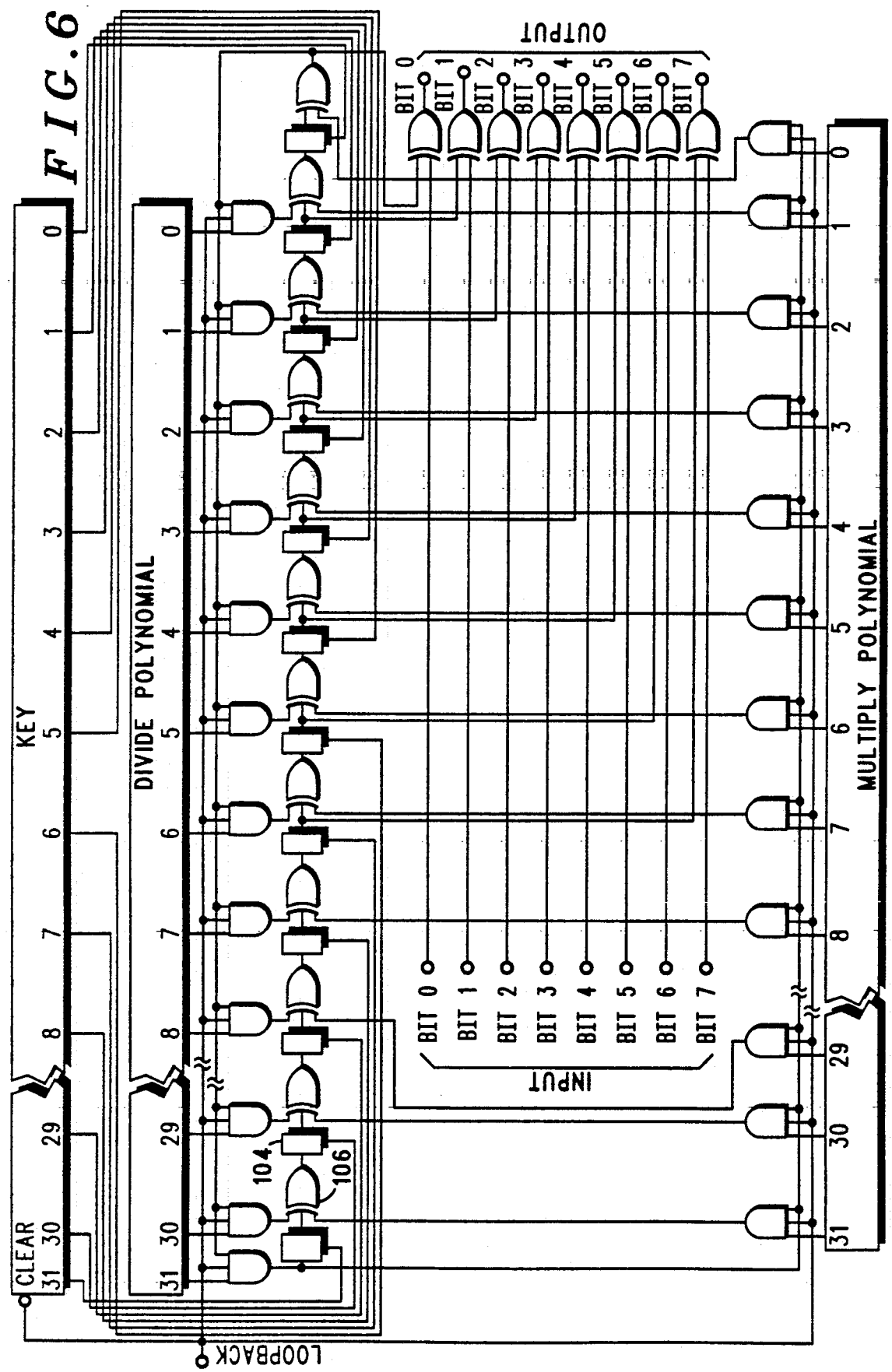

ENCRYPTION APPARATUS

FIELD OF THE INVENTION

This invention relates generally to the encryption of data.

BACKGROUND OF THE INVENTION

Businesses typically transmit data using radio communications and telephonic communications. This data may be related to the operations of the business or businesses and should be kept secret. Data transmitted in this manner can be received by competitors of the intended party and used for the competitor's gain and/or the intended party's detriment.

One solution to this problem is to encrypt the data before transmission and decrypt the data after reception. The encryption is typically done with an encryption circuit using a key and polynomial that manipulates the data. An example of an encryption circuit is illustrated in FIG. 1. The data to be encrypted is clocked through the shift registers serially. Certain shift register outputs are fed back to be logically exclusive OR'ed with the output of the previous stage. The polynomial is determined by which stages are fed back. The key determines the initial state of the shift register. The output of the circuit is the encrypted data that is a representation of the original data but gives no indication as to the original data. When the encrypted data is received, it is typically decrypted using the same circuit and therefore the same key and polynomial used to encrypt the data.

Ideally, only the intended party will have the key and polynomial used to encrypt the data and therefore have the ability to decrypt the data. Because the polynomial doesn't change, however, a competing party with the knowledge and facilities for breaking the code has plenty of time to decipher it. An additional problem is that if the polynomial is changed by moving the feedback paths, the data with the shift registers must be shifted out using the old encryption before the new encryption can begin. Also, the serial shifting of data to be encrypted creates a delay between the time the data is input to the circuit to the time it is output as encrypted data. This creates a need for an encryption circuit with substantially zero delay that uses programmable keys and polynomials to make decryption more difficult for unintended parties.

SUMMARY OF THE INVENTION

The present invention provides encryption/decryption capabilities with substantially zero delay. The apparatus is comprised of two memory devices, logical AND devices, a shift register, and exclusive OR logic devices. Each output of the first memory device is coupled to an input of a shift register. Each of the outputs of the second memory device is coupled to an input of each of the logical AND devices whose outputs are coupled to inputs of the shift register. The output of the last stage of the shift register is coupled to an input of each of the logical AND devices. The output of the preceding stage of the shift register is coupled to an input of an exclusive OR logic device whose other input is coupled to an output of a logical AND device. The output of each of the exclusive OR logic devices is coupled to the input of the next stage of the shift register. Each of the outputs of the first eight stages of the shift register are coupled to each of the inputs of the exclusive OR logic devices. Each bit of the input of the encryption apparatus is coupled to an input of the exclusive OR logic devices.

A key is loaded into the first memory device and a polynomial is loaded into the second memory device. Both the key and the polynomial, used to determine how the input data will be encrypted, are known by the receiving end of the transmitted encrypted data. The key is loaded into the shift register and each bit is shifted through the exclusive OR logic devices to the next stage of the shift register. The outputs of the last eight stage of the shift registers are exclusive OR'ed with the input data. The outputs of these exclusive OR devices is the encrypted data.

BRIEF DESCRIPTION OF THE DRAWINGS

FIG. 3 shows a block diagram of the present invention used in a typical system application;

FIG. 4a shows a memory map for polynomials for use in the system application;

FIG. 4b shows a memory map for keys for use in the system application;

FIG. 5 shows an encryption information format; and

FIG. 6 shows an alternate embodiement of the present invention.

DETAILED DESCRIPTION OF THE PREFERRED EMBODIMENT

Figure 1:
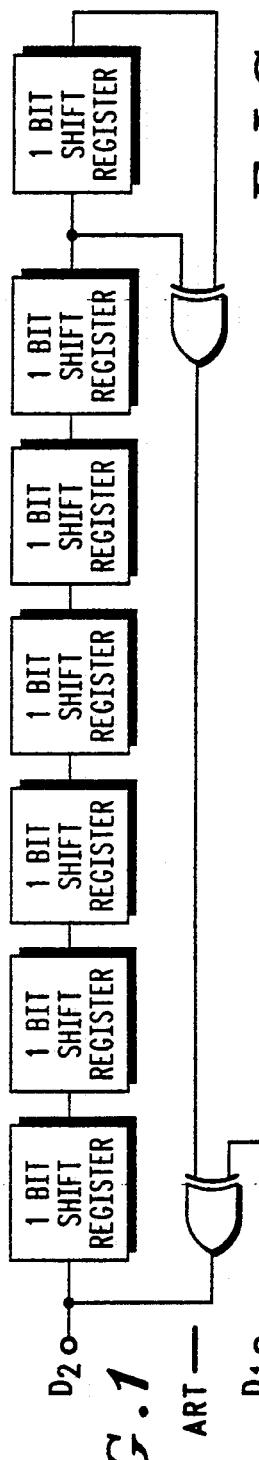
FIG. 1 shows a prior art block diagram for encryption of data.
Figure 2:
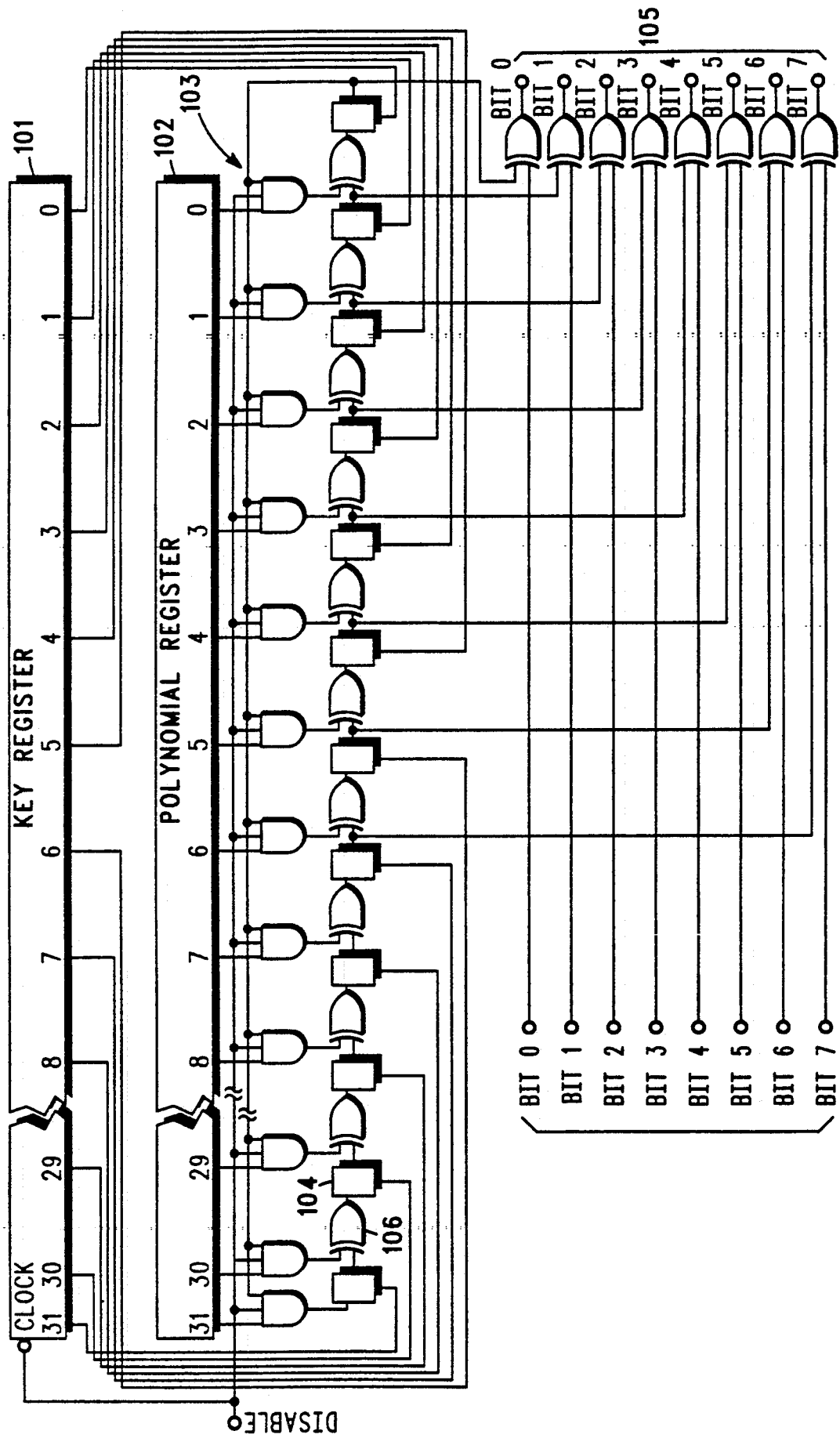
FIG. 2 shows a block diagram of the present invention.

The encryption circuit of the present invention can encrypt and decrypt voice and data with substantially zero delay. This is accomplished by not shifting the input data to be encrypted/decrypted through a shift register as done in the prior art. The only delay involved in the circuit is the delay associated with the exclusive OR(XOR) gates (105). The present invention also provides for easily changing the key and polynomial simply by loading new values into the respective register.

The encryption/decryption circuit, in the preferred embodiment, includes two registers; one for the key (101) and one for the polynomial (102). The key and polynomial, which are predefined, determine if and how the data will be encrypted. If both the Key and Polynomial are zero, the encryptor/decryptor will transmit the data without encrypting/decrypting. If either one is a non-zero value, the circuit will encrypt/decrypt differently for different values.

Each output bit of the key register (101) is connected to an input of a parallel loading shift register (104). The shift register (104) must be the same length as the number of bits in the key. In the preferred embodiment, the key and polynomial are thirty-two bits in length. Alternate embodiments may have different length keys and polynomials and still operate properly.

Each output bit of the polynomial register (102) is connected to an input of a three input logical AND gate (103). The second input of each AND gate (103) is connected to a disable line that is also connected to the key register's clear input. The disable will clear the key register (101) and disable the polynomial to allow the input data to be transmitted through the encryptor circuit without encryption/decryption. The third input of each AND gate (103) is connected to the output of the last stage of the shift register (104).

Each output bit of the shift register (104) is XOR'ed with the output of the corresponding AND gate (103). The output of the XOR gate is the shift-in input of the next stage of the shift register (104). In the preferred embodiment, the outputs of the last eight stages of the shift register (104) are XOR'ed with the input data to be encrypted/decrypted. In alternate embodiments, any eight stages of the shift register can be used as the inputs to the XOR gates. The outputs of these XOR gates (105) is the encrypted/decrypted data.

To begin encrypting/decrypting data, the value loaded into the key register must be defined. This value can be a predefined key value or a predefined key modified by an XOR operation with a modifier. The modifier can be the position or frame number of the data to be encrypted in the stream of data going through the encryption circuit. The key value, the modifier, and the polynomial are known by both the sending and the receiving devices, preventing an unintended receiver form receiving these values.

The circuit operates by first loading the key register (101) with the key or its modified value and the polynomial (102) register with its value. The contents of the key register is then loaded into the shift register (104) prior to the time that the data is to be encrypted.

The polynomial will determine at which point the output of a stage of the shift register (104) will be XOR'ed with the output of the final stage of the shift register (104). A binary "1" in any polynomial bit position will allow that shift register bit to be XOR'ed (106) with the final stage's (104) output that has been fed back through the AND gate (103). The output of this XOR operation is shifted into the next stage of the shift register (104) on the next clock cycle. After each byte of input data is encrypted an output, the shift register is clocked to shift its contents down one bit to encrypt/decrypt the next byte of input data.

In the preferred embodiment, the shift registers are shifted a bit at a time. In an alternate embodiment, the shift register can be shifted a byte at a time. The rate at which the shift register is clocked can be programmable in another embodiment.

FIG. 3 illustrates the use of the present invention in a typical communications network where data and/or digitized voice is sent in time division multiplex (TDM) frames between a first device (300) and a second device (320). The memory (305) contains the key and polynomials used for encryption. The packet switch sends the encrypted data over the packet switch bus (301) to either the radio interface (303), telephone interface (304), or other such interfaces on the bus (301). The interfaces in turn send the data to a receiving device (320) having similar interfaces (303 and 304). The receiving device (302) has the same encryption apparatus to decode the incoming data.

FIGS. 4a and 4b show possible memory maps for the polynomials (FIG. 4a) and keys (FIG. 4b) for such a system. The memory addresses (305) of the keys and polynomials are communicated to a receiving device by an encryption information word, shown FIG. 5. The key (501) and polynomial (502) addresses in the encryption information word indicate the location in the memory (305) maps of the key and polynomial that are about to be used to encrypt the data. This allows the receiving device, which has the same memory maps with identical keys and polynomials stored in the same locations, to know how to decrypt the data. The frame number XOR (503) tells the receiving device if the least significant bits of the key are to be XOR'ed with the TDM frame number. The frame numbers are synchronized between the two devices (300 and 320). In the preferred embodiment, a "1" indicates the XOR should take place and a "0" indicates the key should be used without changes.

When signal bandwidth for the network illustrated in FIG. 3 is allocated for an information transfer from the first device (300) to the second device (320), the key and polynomial address information is sent by the controlling device in the bandwidth allocation information. Since bandwidth is reallocated as required, the key and polynomial are randomly changed. When the devices (320 and 300) are transferring information, the key and polynomial that were specified by the addresses in the bandwidth allocation message are used. This allows each information transfer to use a different key and polynomial combination if required. In other embodiments, the key and polynomial may be changed by randomly sending an encryption control message from the first device (300) to the second device (320) and vice versa.

An alternate embodiment of the present invention is illustrated in FIG. 6. This embodiment uses two polynomials, a multiply polynomial and a divide polynomial. The procedures outlined above for the preferred embodiment apply to this alternate embodiment with the exception that a second polynomial must be loaded into the second polynomial register. The output of the second polynomial is AND'ed with the disable signal and the input to the first stage of the shift register. The outputs of the AND gates are XOR'ed with the first polynomial and the outputs of the shift registers as in the preferred embodiment. The addition of the second polynomial adds even more security since an unintended receiver must now decode two constantly changing polynomials.

Using a constantly changing key and programmable polynomial or polynomials increases the security of the system. By the time an unintended receiving party decodes the polynomial, a new key and polynomial is being used to encrypt the data. The unintended receiver will always be one step behind the encryption circuit, making decrypting of the data and/or digitized voice very difficult.

The substantially zero delay of the present invention prevents the time gap present in the prior art between the data being input to the encryptor and output from the encryptor. An additional benefit is the changing of the key and polynomial at any time without waiting for the presently encrypted data to be shifted out of the shift register. This increases the frequency at which the key and polynomial can be changed, thereby increasing the security of the system.

We claim:

1. An apparatus for encrypting and decrypting an input signal from a signal source to produce an encrypted or decrypted output signal using a preselected key signal and a preselected polynomial signal, comprising:

(a) first storage means for storing the preselected key signal, the first storage means having at least one output;

(b) shift register means, having at least one stage, each stage having an output, and a load input, the load input of each stage coupled to one output of the first storage means;

(c) second storage means for storing the pre-selected polynomial signal, the second storage means having at least one output;

(d) first means for logically combining the at least one output of the second storage means and the at least one output of the shift register means, the first means for logically combining having at least one output coupled to the input of the at least one stage of the shift register means; and (e) second means for logically combining the at least one output of the shift register means and the input signal, an output of the second means for combining being the encrypted or decrypted output signal.

2. The apparatus of claim 1 wherein the first and second storage means are memory registers.

3. The apparatus of claim 1 wherein the first means for logically combining is at least one logical AND gate.

4. The apparatus of claim 1 wherein the second means for logically combining is at least one logical exclusive OR gate.

5. The apparatus of claim 1 wherein the output of a last stage of the shift register means is coupled to an input of the first means for logically combining.

6. The apparatus of claim 1 and further including means for disabling coupled to an input of the first means for logically combining and an input of the first storage means.

7. The apparatus of claim 1 wherein the at least one stage of the shift register means is coupled to a first input of a plurality of logical exclusive OR gates and the at least one output of the first means for logically combining is coupled to a second input of the plurality of logical exclusive OR gates and outputs of the logical exclusive OR gates are coupled to at least one stage of the shift register means.

8. An apparatus for encrypting and decrypting an input signal from a signal source to produce an encrypted or decrypted output signal using a preselected key signal stored in a first memory register and a preselected polynomial signal stored in a second memory register, the first and second memory registers having a plurality of outputs, comprising:

(a) a shift register having a plurality of stages, each stage having a shift input, a load input, and an output, each load input coupled to an output of the plurality of outputs of the first memory register;

(b) a plurality of logical AND gates, each logical AND gate having a first, a second, and a third input, and an output, the first input coupled to one of the plurality of outputs of the second memory register, the second input of each of the plurality of logical AND gates coupled to the output of one of the plurality of stages of the shift register;

(c) means for disabling coupled to the third input of each of the logical AND gates of the plurality of logical AND gates and an input of the first memory register;

(d) a plurality of first logical exclusive OR gates having a first and a second input and an output, the first input of each of the plurality of logical exclusive OR gates coupled to the output of each of the plurality of logical AND gates, the second input of each of the plurality of the first logical exclusive OR gates coupled to the output of a stage of the plurality of stages of the shift register and one of the plurality of first logical exclusive OR gates coupled to the shift input of one of the plurality of stages of the shift register; and (e) a plurality of second logical exclusive OR gates having a first and a second input and an output, the first input of each second logical exclusive OR gate coupled to the input signal from the signal source and the second input of each second logical exclusive OR gate coupled to the output of one of the plurality of stages of the shift register.

9. The apparatus of claim 8 and further including loading the first memory register by external means.

10. The apparatus of claim 8 and further including loading the second memory register by external means.

11. An apparatus for encrypting and decrypting an input signal from a signal source to produce an encrypted or decrypted output signal using a preselected key signal, a preselected divide polynomial signal, and a preselected multiply polynomial signal, comprising:

(a) first storage means for storing the preselected key signal, the first storage means having at least one output;

(b) shift register means, having at least one stage, each stage having an output, a shift input, and a load input, the load input of each stage coupled to one output of the first storage means;

(c) second storage means for storing the pre-selected divide polynomial signal, the second storage means having at least one output;

(d) first means for logically combining the at least one output of the second storage means and the at least one output of the shift register means, the first means for logically combining having at least one output coupled to the shift input of the at least one stage of the shift register means;

(e) third storage means for storing the preselected multiply polynomial signal, the third storage means having at least one output;

(f) second means for logically combining one output of the at least one output of the first means for logically combining and the at least one output of the third storage means; and (g) third means for logically combining the at least one output of the shift register means and the input signal, an output of the third means for combining being the encrypted or decrypted output signal.

12. The apparatus of claim 11 wherein the first, second, and third storage means are memory registers.

13. The apparatus of claim 11 wherein the first and second means for logically combining are logical AND gates.

14. The apparatus of claim 11 wherein the third means for logically combining is a logical exclusive OR gate.

15. The apparatus of claim 11 wherein an output of a last stage of the shift register means is coupled to an input of the first means for logically combining.

16. The apparatus of claim 11 and further including the input to a first stage of the at least one stage of the shift register means coupled to an input of the second means for logically combining.

17. The apparatus of claim 11 and further including means for disabling coupled to an input of the first means for logically combining, an input of the second means for logically combining, and an input of the first storage means.

18. A communications network, comprising:

(a) means for receiving from a signal source, a signal comprising a preselected key, a preselected polynomial, and an encrypted signal;

(b) means for transmitting a signal comprising a preselected key, a preselected polynomial, and an encrypted signal; and (c) a packet switch comprising a processor, memory, and an encryption apparatus, the encryption apparatus comprising:

first storage means for storing the preselected key signal, the first storage means having at least one output;

shift register means, having at least one stage, each stage having an output and an input, the input of each stage coupled to an output of the first storage means;

second storage means for storing the pre-selected polynomial signal, the second storage means having at least one output;

first means for logically combining the at least one output of the second storage means and the at least one output of the shift register means, the first means for logically combining having at least one output coupled to the at least one stage of the shift register means; and second means for logically combining the at least one output of the shift register means and the encrypted signal, an output of the second means for combining being a decrypted output signal.

* * * * *